US008261336B2

(12) United States Patent
Gasparini et al.

(10) Patent No.: US 8,261,336 B2
(45) Date of Patent: Sep. 4, 2012

(54) SYSTEM AND METHOD FOR MAKING ACCESSIBLE A SET OF SERVICES TO USERS (75) Inventors: Louis A Gasparini, San Mateo, CA (US); William H Harris, Woodside, CA (US)

(73) Assignee: EMC Corporation, Hopkinton, MA (US)

( * ) Notice: Subject to any disclaimer, the term of this patent is extended or adjusted under 35 U.S.C. 154(b) by 1205 days.

(21) Appl. No.: 11/153,678

(22) Filed: Jun. 15, 2005

(65) Prior Publication Data

US 2006/0026421 A1  Feb. 2, 2006

Related U.S. Application Data (60) Provisional application No. 60/580,080, filed on Jun. 15, 2004.

(51) Int. Cl.
H04L 29/06 (2006.01)
H04L 9/32 (2006.01)
G06F 7/04 (2006.01)
G06F 15/16 (2006.01)
G06F 17/30 (2006.01)

(52) U.S. Cl. ......... 726/10; 713/173; 713/175; 713/182; 713/186; 713/156; 76/8; 76/12

(58) Field of Classification Search ............... 713/156, 713/173, 175, 186, 182; 726/8, 10, 12
See application file for complete search history.

(56) References Cited

U.S. PATENT DOCUMENTS

| 5,721,781 | A | * | 2/1998 | Deo et al. | 705/67 |
|---|---|---|---|---|---|
| 5,841,865 | A | * | 11/1998 | Sudia | 380/286 |
| 6,161,139 | A | * | 12/2000 | Win et al. | 709/225 |
| 6,374,359 | B1 | * | 4/2002 | Shrader et al. | 726/5 |
| 6,421,768 | B1 | | 7/2002 | Purpura | |
| 6,691,232 | B1 | * | 2/2004 | Wood et al. | 726/6 |
| 6,715,080 | B1 | * | 3/2004 | Starkovich et al. | 726/7 |
| 6,772,331 | B1 | * | 8/2004 | Hind et al. | 713/151 |
| 6,826,690 | B1 | | 11/2004 | Hind et al. | |
| 6,950,949 | B1 | * | 9/2005 | Gilchrist | 726/19 |
| 6,985,953 | B1 | * | 1/2006 | Sandhu et al. | 709/229 |
| 7,100,049 | B2 | * | 8/2006 | Gasparini et al. | 713/170 |
| 7,113,918 | B1 | * | 9/2006 | Ahmad et al. | 705/26 |
| 7,216,236 | B2 | * | 5/2007 | Kou et al. | 713/183 |
| 7,251,633 | B2 | * | 7/2007 | Ludtke et al. | 705/64 |
| 2001/0045451 | A1 | * | 11/2001 | Tan et al. | 235/375 |
| 2003/0131244 | A1 | * | 7/2003 | Buoncristiani et al. | 713/176 |
| 2004/0111621 | A1 | * | 6/2004 | Himberger et al. | 713/182 |
| 2005/0076204 | A1 | * | 4/2005 | Thornton et al. | 713/156 |
| 2005/0137981 | A1 | * | 6/2005 | Maes | 705/44 |
| 2006/0005237 | A1 | * | 1/2006 | Kobata et al. | 726/12 |

OTHER PUBLICATIONS

Thornton et al; U.S. Appl. No. 60/495,864. "Security Automation Technology". Specification pp. 6-16. Aug. 15, 2003.*
International Search Report, Oct. 3, 2006, 3 pages.
Written Opinion of the International Searching Authority, Oct. 3, 2006, 2 pages.

* cited by examiner

Primary Examiner — Edan Orgad
Assistant Examiner — Kari Schmidt
(74) Attorney, Agent, or Firm — Ryan, Mason & Lewis, LLP (57) ABSTRACT

A system and method authenticates a user if the user is associated with a certificate on a device the user is using to communicate, even if other users are also associated with the same certificate and/or the user is associated with other certificates on other devices.

20 Claims, 5 Drawing Sheets

SYSTEM AND METHOD FOR MAKING ACCESSIBLE A SET OF SERVICES TO USERS

RELATED APPLICATIONS

This application claims the benefit of U.S. Provisional Application Ser. No. 60/580,080, entitled, "Device ID Certificates with User Binding," filed on Jun. 15, 2004 by Louis Gasparini and William Harris, and is related to U.S. application Ser. No. 11/050,549 entitled, "System and Method for Authentication of Users and Communications Received from Computer Systems," filed on Feb. 3, 2005 by Louis Gasparini and William Harris, and each is hereby incorporated herein by reference in its entirety.

FIELD OF THE INVENTION

The present invention is related to computer software and more specifically to computer software for authentication using digital certificates.

BACKGROUND OF THE INVENTION

There are many uses for digital certificates to identify entities. Some common uses of certificates include server-to-server authentication and establishing SSL connections from a Web site's server.

However the use of digital certificates to identify the end user to a Web site or to provide another set of one or more services to the user has not been successful to date. One reason for the lack of success include the difficulty in transporting a user's private key and certificate between machines. If a user wants to use different machines to access a Web site, the user must transfer a certificate bound to that user to each machine the user will use.

Another reason for the lack of success is the difficulty of the infrastructure related to deploying and maintaining the Certificate Authority and managing the certificate revocation list.

What is needed is a system and method that can use digital certificates to authenticate a user to allow the user to access services such as private areas of a Web site, without requiring a user to transfer a certificate to each of the different machines the user will use and without maintaining a separate certificate authority and revocation list dedicated to the Web site or other set of one or more services.

SUMMARY OF INVENTION

A system and method provides access to a set of one or more services, such as a restricted area of a Web site, if an authenticated certificate exists on the device the user is using to access the set of one or more services, and the certificate is bound to an identifier of the user. If no such certificate exists, but an authenticated certificate exists on the user's device that is not bound to the user identifier, if the user provides sufficient indicia of the user's authenticity, the certificate that already exists on the device is bound to that user. If an authenticated certificate does not exist on the user's device, one may be provided and bound to the user if the user provides sufficient indicia of the user's authenticity. The user identifier may be bound to more than one certificate, a different one for each device, and more than one user may be bound to any certificate. Sufficient indicia of the user's authenticity may be obtained via an out-of-band communication channel, such as a telephone call, or an e-mail message. The system and method thus eliminates the need for complex certificate management facilities: it uses the certificates available, adding a certificate as needed, and reuses them for other users if needed.

DETAILED DESCRIPTION OF THE DRAWINGS

Figure 1:
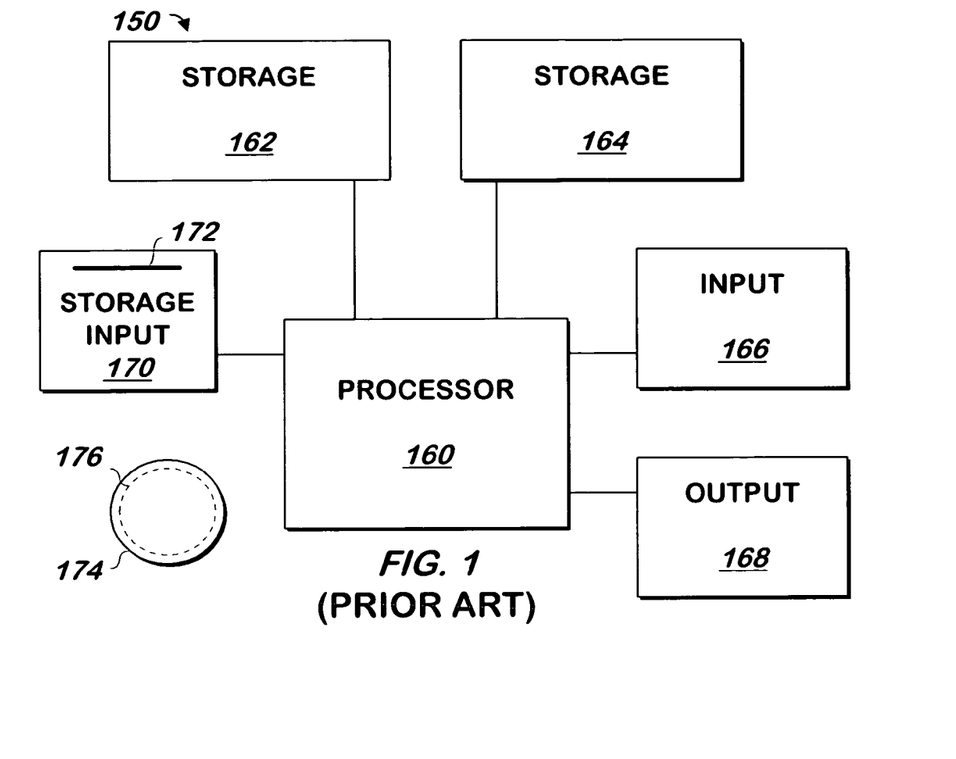
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
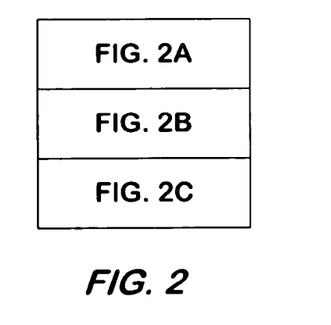
FIG. 2, consisting of FIGS. 2A, 2B and 2C, is a flowchart illustrating a method of authenticating, and providing services to, a user according to one embodiment of the present invention.
Figure 2A:
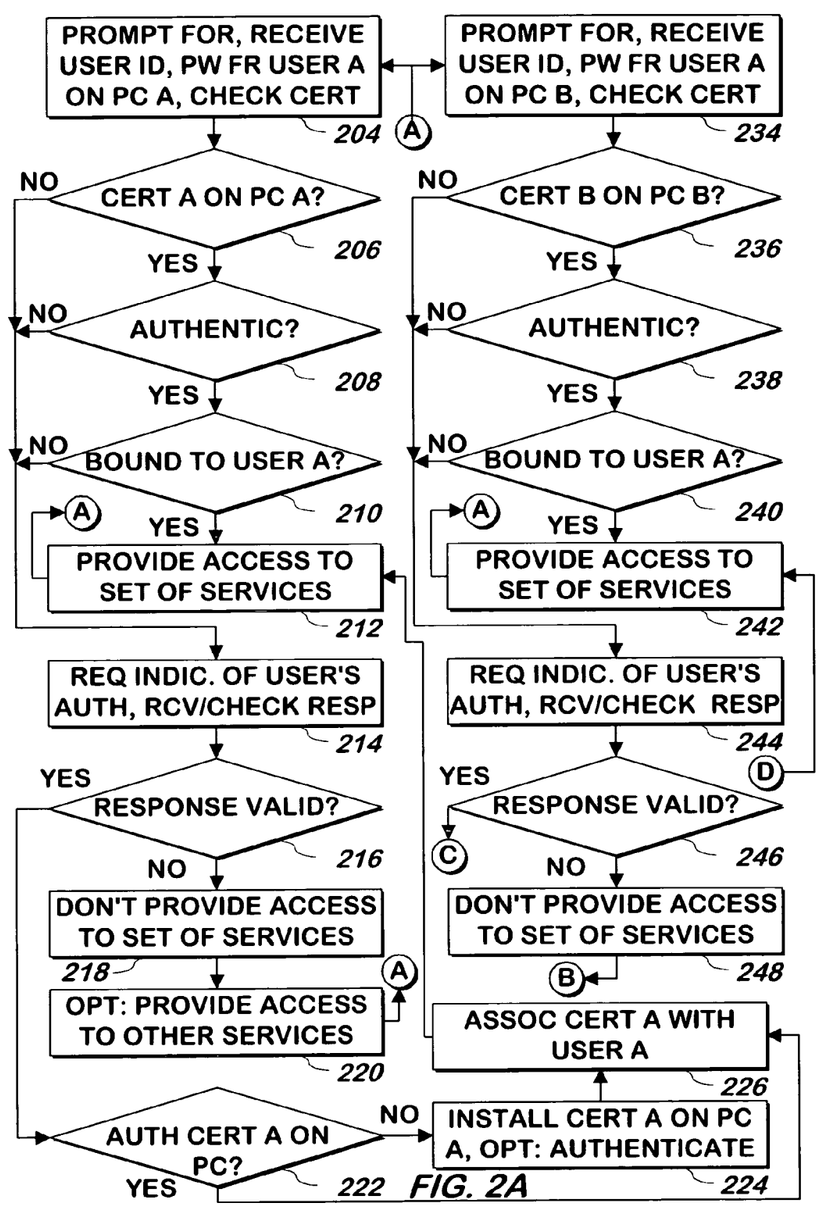
Figure 2B:
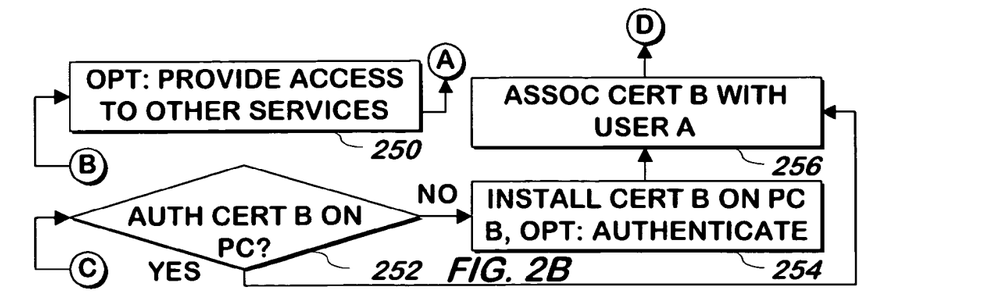
Figure 2C:
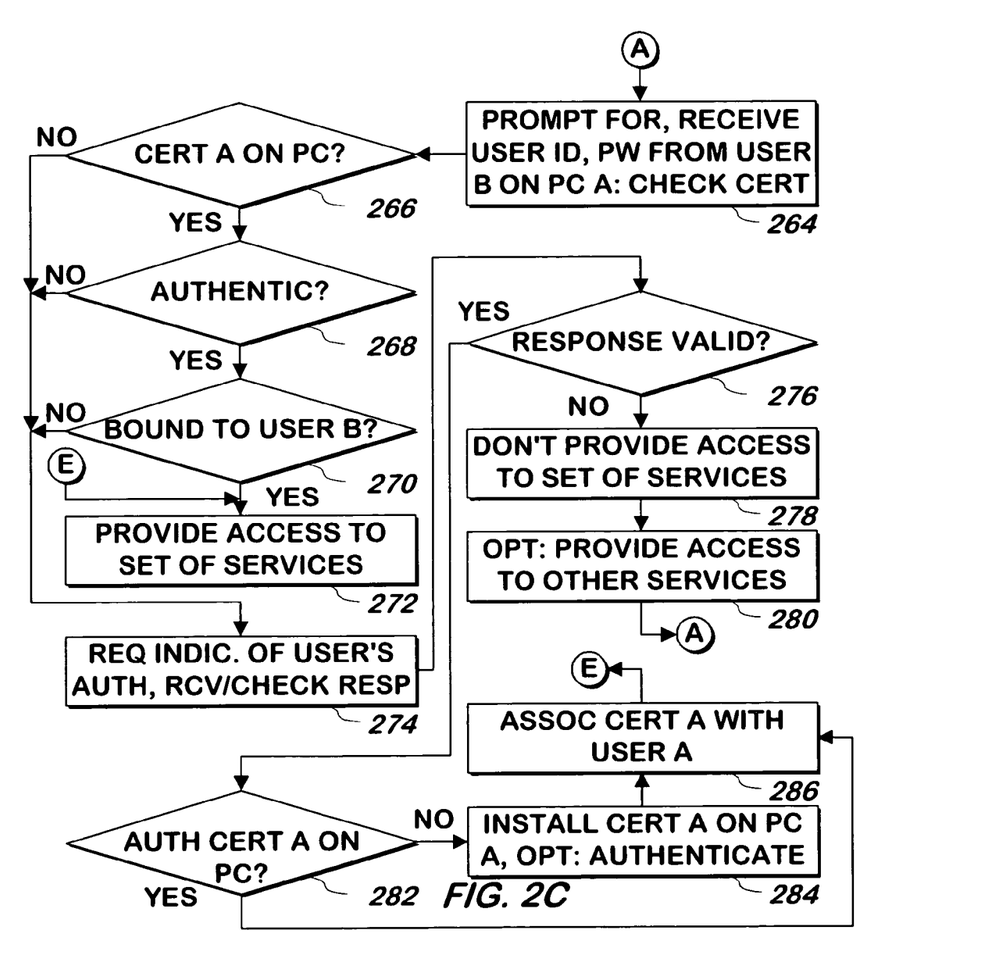

Referring now to FIG. 2, consisting of FIGS. 2A, 2B, and 2C, a flowchart illustrating a method of authenticating, and providing services to, a user is shown according to one embodiment of the present invention. One of many users, user A, is prompted for a user identifier and password and these things are received from user A while using computer system A 204. In one embodiment, there are multiple computer systems available for use by users, with each of some or all of these computer systems available for use by multiple users. As described herein, the computer systems are personal computer systems, however, any computer-based device may be used by the present invention.

Step 204 includes checking a digital certificate on a computer system. The digital certificate may be a conventional digital certificate, or may be another form of authentication of a computer system or user as described in more detail below and as used herein a "digital certificate" has this meaning. The digital certificate may be stored on a hard drive, integrated into hardware or firmware on a memory chip built into computer system A, or may be part of a removable device, such as a smart card, USB memory token, or another device capable of storing a certificate. If all of the following are true: there is a certificate on computer system A 206, the certificate is authentic 208, and it is bound to user A as described in more detail below 210, user A is provided access to a set of one or more services 212, such as access to a certain portion of a web site, such as the portion of a web site that allows user A to check his or her balance at a financial institution, and the method continues at any of step 204, 234 or 264. Step 212 may include the processing of multiple requests, such as the processing of one or more requests for web pages using any conventional technique. The certificate is any conventional digital certificate.

If any or all of: there is no certificate on computer system A 206, the certificate is not valid 208 or the user is not bound to that certificate 210, an indicia of user A's authenticity, beyond that provided in step 204, is requested, and received 214. In one embodiment indicia of user A's authenticity is requested and/or received out of band, such as via an e-mail account registered previously to user A, or to a cellular telephone number registered previously to user A. The indicia of user A's authenticity may be a token preregistered to the user and known to the user but not otherwise generally associated with that user, such as the user's mother's maiden name, favorite pet's name or the like. User A may be informed that someone is attempting to log in as that user and to only provide the token if user A is, in fact, attempting to log in. Alternatively, a challenge phrase may be provided to the user out of band, such as via an e-mail message or telephone call and the user may be requested to provide the challenge phrase via a web page to which the user is redirected upon the failure of the location of an authentic certificate bound to user A as described above.

Step 214 includes checking the validity of the user's response, for example with that stored for the user either prior to step 214 during a registration phase, or stored temporarily associated with the user at step 214, such as when a challenge phrase is generated. If a valid response is not received 216, the set of services that would be provided as part of step 212 is not provided 218, although other services may be provided 220. Services that are not provided as part of step 218 are those for which it is desirable to ensure the authenticity of user A, and services that are provided as part of step 220 are any other services. Following step 220, the method continues at any of steps 204, 234 or 264.

If the response is valid 216, if there was not an authenticated certificate on computer system A as described above 222, a certificate may be installed on computer system A, and optionally authenticated 224 and the certificate is bound or otherwise associated 226 with the user identifier of user A received in step 204 and the method continues at step 212. If an authenticated certificate was installed on computer system A 222, the method continues at step 226.

Steps 234-256 operate exactly the same as steps 204-226, except that computer system B is used by user A instead of computer system A. Computer system B is a computer system that is different from, and may be remotely located from, computer system A. Each of steps 234-256 operate as described for their counterparts, referenced 30 less (e.g. step 234 operates like step 204) except that in steps involving computer system A, computer system B is used instead. The effect is that a certificate may be bound to, or otherwise associated with, user A on each of computer systems A and B, meaning that user A may be bound to multiple certificates.

Although two computer systems are described in the Figure, any number of computer systems may be used by a user, each having its own certificate bound to user A in order to provide user A access to the set of services on that computer system. If user A does not provide sufficient indicia of authenticity on a computer system, any certificate on that computer system will not be bound to user A. Furthermore, any certificate existing on a computer system used to properly authenticate user A can be bound to the user and used to authenticate the user after sufficient indicia of the user's authenticity is provided if the certificate can be authenticated. A new certificate need not be installed in that case and there is no specific set of certificates that are required on any computer system.

Steps 264-286 operate as described above for steps 204-226 except that in steps 264-286, the user is user B, a user different from user A. Otherwise, each step 264-286 operates as the step numbered sixty less. For example, step 264 operates the same as step 204 except that user A is replaced by user B. Thus, user A and user B can be bound or otherwise associated with the same certificate identifier. Although two users are described in FIG. 2, any number of users may be used.

Any of the three sets of steps 204-226, 234-256 and 264-286 may be performed as many times as desired, and the sets may, as among each set, performed in any order. Thus, the first set may be performed twice, and then the second set may be performed.

The effect is to allow many to many relationships between users and certificate identifiers. A single user may be associated with one or more certificate identifiers and a single certificate identifier may be associated with many users.

Figure 3:
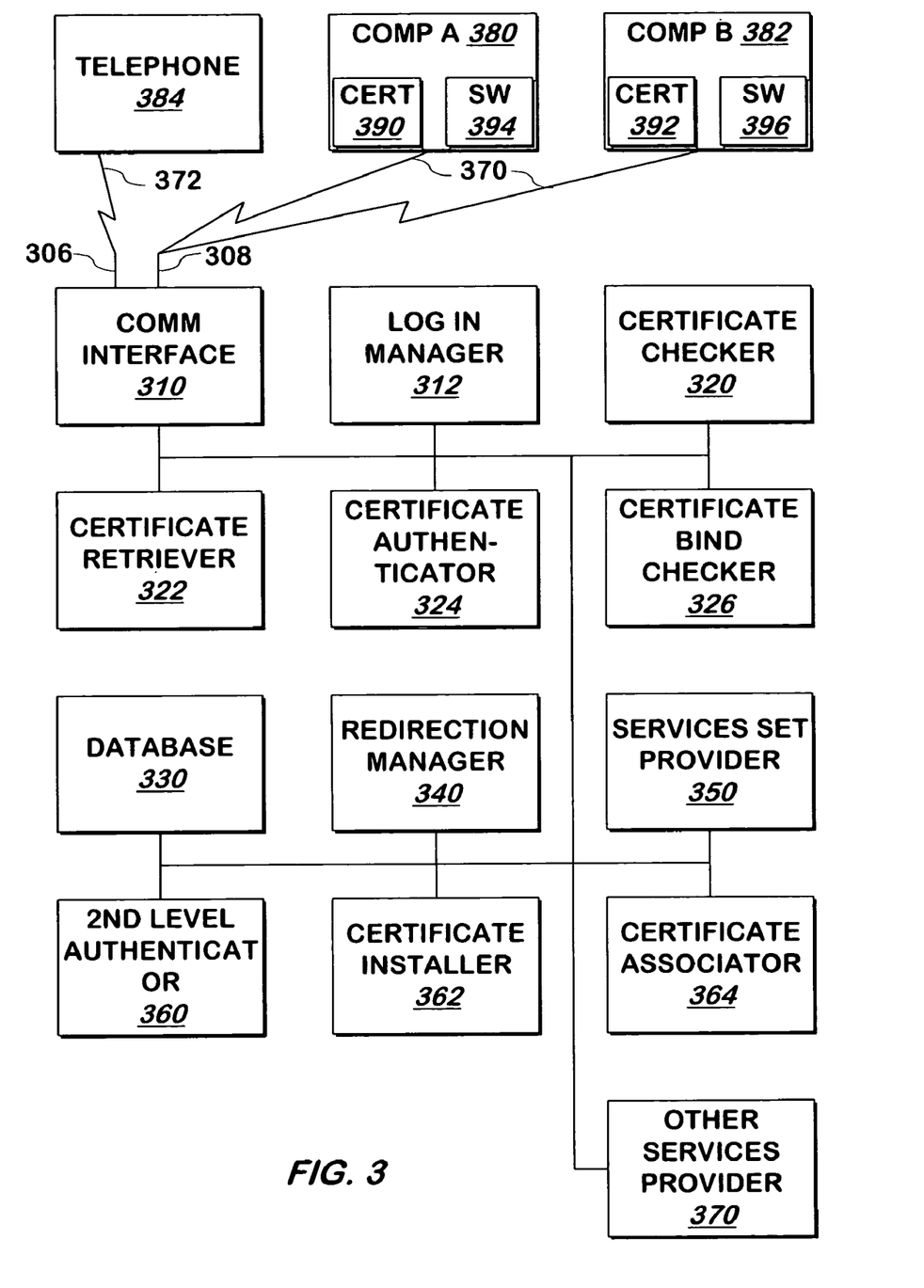
FIG. 3 is a block schematic diagram of a system for authenticating, and providing services to, a user according to one embodiment of the present invention.

Referring now to FIG. 3, a system for authenticating, and providing services to, a user is shown according to one embodiment of the present invention. In one embodiment, all users communicate via devices 380, 382 and/or telephone 384 and all such communication is made via communication interface 310. Communication interface 310 includes a conventional communication interface that can communicate using conventional communications protocols, such as TCP/IP, Ethernet and/or other conventional communications protocols. Communication interface 310 communicates via input/output 308 coupled to network 370, which is coupled to computer systems 380, 382, which are conventional computer systems as described above, or any computer based device, such as a cellular telephone or the like, each being associated with, or capable of storing or accessing, a conventional digital certificate 390, 392. Network 370 includes a conventional computer communications network, such as the Internet, Ethernet and/or other conventional communications network.

In one embodiment, communications interface 310 also communicates via input/output 306 with the public switched telephone network 372 to communicate via voice communication with a conventional telephone 384 such as a conventional cellular telephone.

A user may use computer system 380 or 382 to request access to a set of one or more services, such as one or more Web pages containing information that is confidential to the user, provider of a Web site, or both, or a request for other services not containing such confidential information.

If the request is for the set of other services, communication interface 310 provides the request to other services provider 370, which provides a response to the request.

If the request is for the set of services, communication interface 310 provides the request and a cookie it receives or retrieves from the device 380, 382 to services set provider 350. When it receives the request, services set provider uses the user's IP address and cookie to locate the user record in database storage 330 to identify whether the user has access to the set of services that services set provider 350 provides as described in more detail below. If so, an indication will be provided in a record corresponding to the IP address and a user identifier in the cookie, which may be stored in encrypted form and decrypted by services set provider 350.

If no such indication is found, or no such user record is found, services set provider 350 provides the user's IP address to log in manager 312, which requests and receives a user identifier and password via a web page it provides. Log in manager 312 authenticates the user by comparing the user identifier and password with user identifiers and passwords stored in database 330, which may include memory or disk storage that includes a conventional database. If a match is located in the conventional fashion, log in manager 312 signals certificate checker 320 with the user identifier and IP address of the user device 380, 382. If a match is not located, log in manager 312 reprompts the user for the user identifier and password.

In one embodiment, any certificate installed in the browser or other program used to access communication interface 310 is received by log in manager 312 with the user identifier and password. In such embodiment, log in manager 312 provides the certificate to certificate checker 320. In another embodiment, certificate checker 320 provides the IP address of the user device 380, 382 to certificate retriever 322, which retrieves any such certificate from the user's device 380, 382 and provides it to certificate checker 320.

If no certificate is received as described above, certificate checker 320 provides the user identifier and IP address to second level authenticator 360 for use as described below. If a certificate is received, certificate checker 320 provides the certificate to certificate authenticator 324, which attempts to authenticate the certificate using conventional techniques. Certificate authenticator 324 indicates to certificate checker 320 whether the certificate is authentic.

If the certificate is not authentic, certificate checker 320 provides the user identifier and IP address to second level authenticator 360 for use as described below. Otherwise, certificate checker 320 provides the identifier of the certificate and the user identifier to certificate bind checker 326.

When it receives the certificate identifier and user identifier, certificate bind checker 326 uses the user identifier to look up the user record in database 330 to determine whether the certificate is bound to the user. In one embodiment, database 330 is a conventional database and user records in database 330 have the format of those 410, 412 in FIG. 4. For example, if the user identifier is that of user A, record 410 will be located, and certificate bind checker 326 identifies whether the certificate identifier matches either certificate A ID or certificate B ID. Certificate bind checker 326 indicates to certificate checker 320 whether the certificate identifier is so bound to the user.

Figure 4:
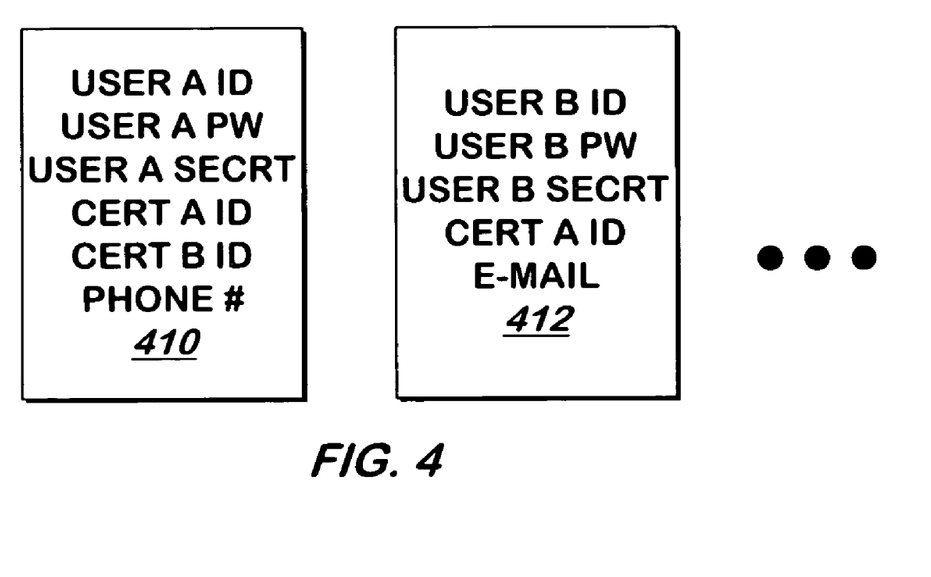
FIG. 4 is an illustration of two database entries according to one embodiment of the present invention.

If the certificate identifier is not bound to the user, certificate checker 320 provides the user identifier and IP address, as well as the certificate identifier, and an indication that the authenticated certificate is not bound to the user, to second level authenticator 360 for use as described below. Otherwise, certificate checker 320 stores in the user record 410 in database storage 330 the IP address of the user, an optional timestamp it obtains by retrieving the current date and time from the operating system (not shown), and an indication that the user is authenticated and stores an optionally encrypted cookie on the user's device 380, 382 containing the user identifier of the user. Certificate checker 320 then provides the user identifier and IP address to services set provider 350.

When so signaled, services set provider 350 again checks the user record corresponding to the user identifier and IP address and this time, the user record will contain the indication that the user is authenticated, and so services set provider 350 will provide a web page allowing access to any services it provides to such user.

In one embodiment, services set provider 350 checks the timestamp in the user record 410 in database 330 and compares it against the current time it retrieves from the operating system (not shown). If the difference exceeds a threshold, services set provider 350 stores an identifier of the service requested in the user record 410 in database 330 and signals certificate checker 320 with the user identifier and IP address of the user device 380, 382. Certificate checker 320 repeats the process described above, and if it signals services set provider 350, services set provider 350 checks the user record 410 in database 330 for an identifier of the service. If it locates it, it provides the service and if not, it provides a web page providing access to the services it can provide the user as described above.

As noted above, if no authenticated certificate is located on the user device 380, 382 that is bound to the user, second level authenticator 360 receives the identifier of the user and the IP address of the device as described above. If an authenticated certificate is stored on the device but not bound to the user, second level authenticator 360 also receives the identifier of the certificate and an indication that the certificate is not bound to the user.

When it receives these items, second level authenticator 360 prompts the user for an additional indicia of the user's authenticity as described herein or in the related applications. This may involve prompting the user for a secret phrase or word such as the user's mother's maiden name, or generating, storing in the account record 410 and providing a challenge phrase via an out-of-band communications channel, such as a phone or e-mail message via communication interface 310, the phone number or e-mail address, and a preference for how the user should be contacted, being stored in the user record 410 and used by second level authenticator 360 to provide it. The user provides the challenge phrase or secret to second level authenticator 360 via a web page it provides and if the one provided matches the one stored in the account record, second level authenticator 360 optionally, deletes any challenge phrase it generated from the account record and, if an authenticated certificate was located on the user's computer system 380, 382, second level authenticator 360 provides the user identifier and certificate identifier to certificate associator 364 and if an authenticated certificate was not located on the user's computer system 380, 382, second level authenticator 360 provides the identifier of the user and the IP address of the user's device to certificate installer 362.

When it receives the user identifier and certificate identifier, certificate associator 364 adds the certificate identifier to the user record 410 corresponding to the user identifier in database 330 and signals certificate checker 320 with the user identifier and IP address. Certificate checker 320 then repeats the process described above, signaling services set provider 350 as described above if an authenticated certificate bound to the user identifier is received.

When it receives the user identifier and IP address, certificate installer 362 installs on the user's computer system 380, 382, or causes to be installed on the user's computer system 380, 382, a certificate 390, 392 or other verifiable means to indicate that a computer system is the same one, or being used by the same user, from one time to the next. In one embodiment, certificate installer 362 requests the browser or other software in the user computer system or other device 380, 382, or requests the user to use the browser, to obtain a conventional digital certificate from a conventional certificate authority. The user computer system 380, 382 may include a removable device such as a smart card or other device that can be transferred to another computer system and that contains storage and may contain processing capabilities on the device.

The user, browser or other software (which may be located on a removable device temporarily made part of the user's computer system 380, 382) complies and stores the certificate 390, 392 on the user's computer system 380, 382, though such storage may in fact be on the removable device that may be only temporarily part of the user's computer system 380, 382. In another embodiment, certificate installer 362 requests the user, browser or software to generate or obtain a public key/private key pair and to sign a challenge phrase with the private key and return the signed challenge phrase and the public key. Certificate installer 362 receives these items, uses the public key to determine whether the signed challenge phrase was signed with the private key, and if so, signs the public key (and optionally, other information) with it's own private key and returns the signed public key to the browser for use as a certificate 390, 392. In one embodiment, software 394, 396 installed on the user's computer system 380, 382 may perform any of the aforementioned functions on the user's computer system instead of the user or the browser, and the software may be located on a removable device into which the private key will be securely stored.

Certificate installer 362 retains or obtains the certificate identifier, such as the signature from certificate installer 362 or the certificate authority, and provides it and the user identifier to certificate associator 364, which operates as described above.

The process described above may be repeated by the same user on a different user computer system 380, 382, for example, using computer system 380, and then computer system 382. Both certificates 390, 392 installed on such computer systems 380, 382 will then be bound to the user identifier. Another user may repeat the process described above on a different computer system or one or more of the computer systems 380, 382 used by the first user, in which case one or more of the certificate identifiers bound to the first user will also be bound to the second user. There is no requirement that certificates be bound to no more than one user and no requirement that a user have only one certificate.

The present invention applies to all types of certificates. Such certificates either securely identify the user or the user's computer system 380, 382, such as digital certificates stored on a user's hard drive. However, other forms of certificates may be used, such as those integrated into the hardware or firmware (e.g. in the BIOS of) of a computer chip on the user's computer system 380, 382 or other device, or those built into, or added in the manner described above with respect to the user's computer system, a removable token coupled to the user's computer system, such as a smart card or USB memory storage device, with optional on-board computing capability. In one embodiment, any or all of these (e.g. computer chip/BIOS, removable storage device with optional on-board computing capability, etc.) are, either alone or with other software installed on the user's computer system 380, 382, capable of securely generating or obtaining and storing a private key, providing their public key, and signing items provided to them, as described above. Thus, in some of these embodiments, the private key need not be released, and unauthorized software cannot obtain it.

What is claimed is:
1. A method of providing access to at least a portion of a web site, comprising:
receiving an identifier of a user over a network from a device;
determining whether a digital certificate is associated with the device;
if the determination is that no digital certificate is associated with the device:
requesting a preregistered indicia of the user's authenticity;
receiving the indicia of authenticity;
responsive to the indicia of authenticity:
associating a digital certificate with the device, wherein the digital certificate is uniquely associated with the device and the device is uniquely associated with the digital certificate;
associating the user with the digital certificate, the digital certificate associated with the device thereby being uniquely associated with the user; and
providing access to the web site;
if the determination is that a digital certificate is associated with the device, further determining whether the digital certificate associated with the device is associated with the user;
if the further determination is that the digital certificate associated with the device is associated with the user, providing access to the web site;
if the further determination is that the digital certificate associated with the device is not associated with the user:
requesting a preregistered indicia of the user's authenticity;
receiving the indicia of authenticity;
responsive to the indicia of authenticity:
associating the user with the digital certificate associated with the device, the digital certificate associated with the device thereby being associated with a plurality of users; and
providing access to the web site;
wherein access to the web site is provided only when the same digital certificate is both associated with the device and associated with the user; and
wherein the user is associated with the digital certificate responsive to the preregistered indicia of authenticity.
2. The method of claim 1, wherein the digital certificate is associated with the device by being stored on the device.
3. The method of claim 2, wherein the device is a computer chip.

4. The method of claim 2, wherein the device is a removable storage device.

5. The method of claim 1, wherein the user is associated with a plurality of digital certificates.

6. The method of claim 5, wherein each of the plurality of digital certificates is associated with a corresponding one of a plurality of devices.

7. The method of claim 1, wherein requesting the indicia of authenticity comprises requesting the indicia of authenticity out of band.

8. The method of claim 1, wherein receiving the indicia of authenticity comprises receiving the indicia of authenticity out of band.

9. A system for providing access to at least a portion of a web site, comprising:
- at least one storage; and
- a processor operatively coupled to the at least one storage, the processor being operative to perform the steps of:
  - receiving an identifier of a user over a network from a device;
  - determining whether a digital certificate is associated with the device;
  - if the determination is that no digital certificate is associated with the device:
    - requesting a preregistered indicia of the user's authenticity;
    - receiving the indicia of authenticity;
    - responsive to the indicia of authenticity:
      - associating a digital certificate with the device, wherein the digital certificate is uniquely associated with the device and the device is uniquely associated with the digital certificate;
      - associating the user with the digital certificate, the digital certificate associated with the device thereby being uniquely associated with the user; and
      - providing access to the set of at least one service;
  - if the determination is that a digital certificate is associated with the device, further determining whether the digital certificate associated with the device is associated with the user;
  - if the further determination is that the digital certificate associated with the device is associated with the user, providing access to the web site;
  - if the further determination is that the digital certificate associated with the device is not associated with the user:
    - requesting a preregistered indicia of the user's authenticity;
    - receiving the indicia of authenticity;
    - responsive to the indicia of authenticity:
      - associating the user with the digital certificate associated with the device, the digital certificate associated with the device thereby being associated with a plurality of users; and
      - providing access to the web site;
  - wherein access to the web site is provided only when the same digital certificate is both associated with the device and associated with the user; and
  - wherein the user is associated with the digital certificate responsive to the preregistered indicia of authenticity.

10. The system of claim 9, wherein the digital certificate is associated with the device by being stored on the device.

11. The system of claim 9, wherein the user is associated with a plurality of digital certificates.

12. The system of claim 11, wherein each of the plurality of digital certificates is associated with a corresponding one of a plurality of devices.

13. The system of claim 9, wherein the processor is further operative to maintain a database indicating at least one of digital certificates associated with respective devices and digital certificates associated with respective users.

14. The system of claim 13, wherein the digital certificate is associated with the user by updating the database.

15. A computer program product comprising a non-transitory computer useable storage medium having computer readable program code embodied therein for providing access to at least a portion of a web site, the computer program product comprising computer readable program code devices configured to cause a computer system to perform the steps of:
- receiving an identifier of a user over a network from a device;
- determining whether a digital certificate is associated with the device;
- if the determination is that no digital certificate is associated with the device:
  - requesting a preregistered indicia of the user's authenticity;
  - receiving the indicia of authenticity;
  - responsive to the indicia of authenticity:
    - associating a digital certificate with the device, wherein the digital certificate is uniquely associated with the device and the device is uniquely associated with the digital certificate;
    - associating the user with the digital certificate, the digital certificate associated with the device thereby being uniquely associated with the user; and
    - providing access to the web site;
- if the determination is that a digital certificate is associated with the device, further determining whether the digital certificate associated with the device is associated with the user;
- if the further determination is that the digital certificate associated with the device is associated with the user, providing access to the set of at least one service;
- if the further determination is that the digital certificate associated with the device is not associated with the user:
  - requesting a preregistered indicia of the user's authenticity;
  - receiving the indicia of authenticity;
  - responsive to the indicia of authenticity:
    - associating the user with the digital certificate associated with the device, the digital certificate associated with the device thereby being associated with a plurality of users; and
    - providing access to the web site;
- wherein access to the web site is provided only when the same digital certificate is both associated with the device and associated with the user; and
- wherein the user is associated with the digital certificate responsive to the preregistered indicia of authenticity.

16. The computer program product of claim 15, wherein the digital certificate is associated with the device by being stored on the device.

17. The computer program product of claim 15, wherein the user is associated with a plurality of digital certificates.

18. The computer program product of claim 17, wherein each of the plurality of digital certificates is associated with a corresponding one of a plurality of devices.

19. The computer program product of claim 15 wherein the computer program product further comprises computer readable program code devices configured to cause a computer system to maintain a database indicating at least one of digital certificates associated with respective devices and digital certificates associated with respective of users.

20. The computer program product of claim 19, wherein the digital certificate is associated with the user by updating the database.

* * * * *